Patented Nov. 15, 1949

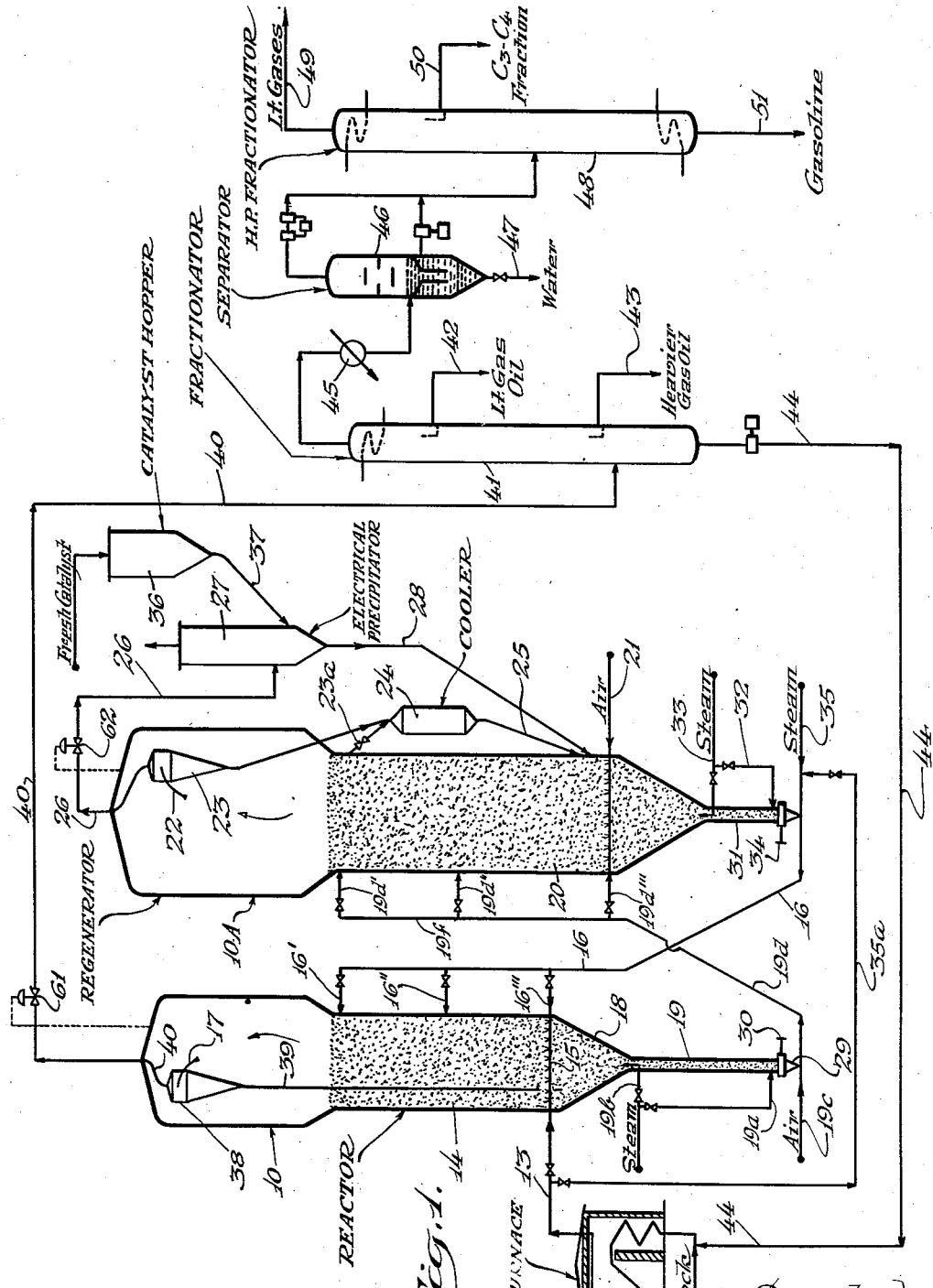

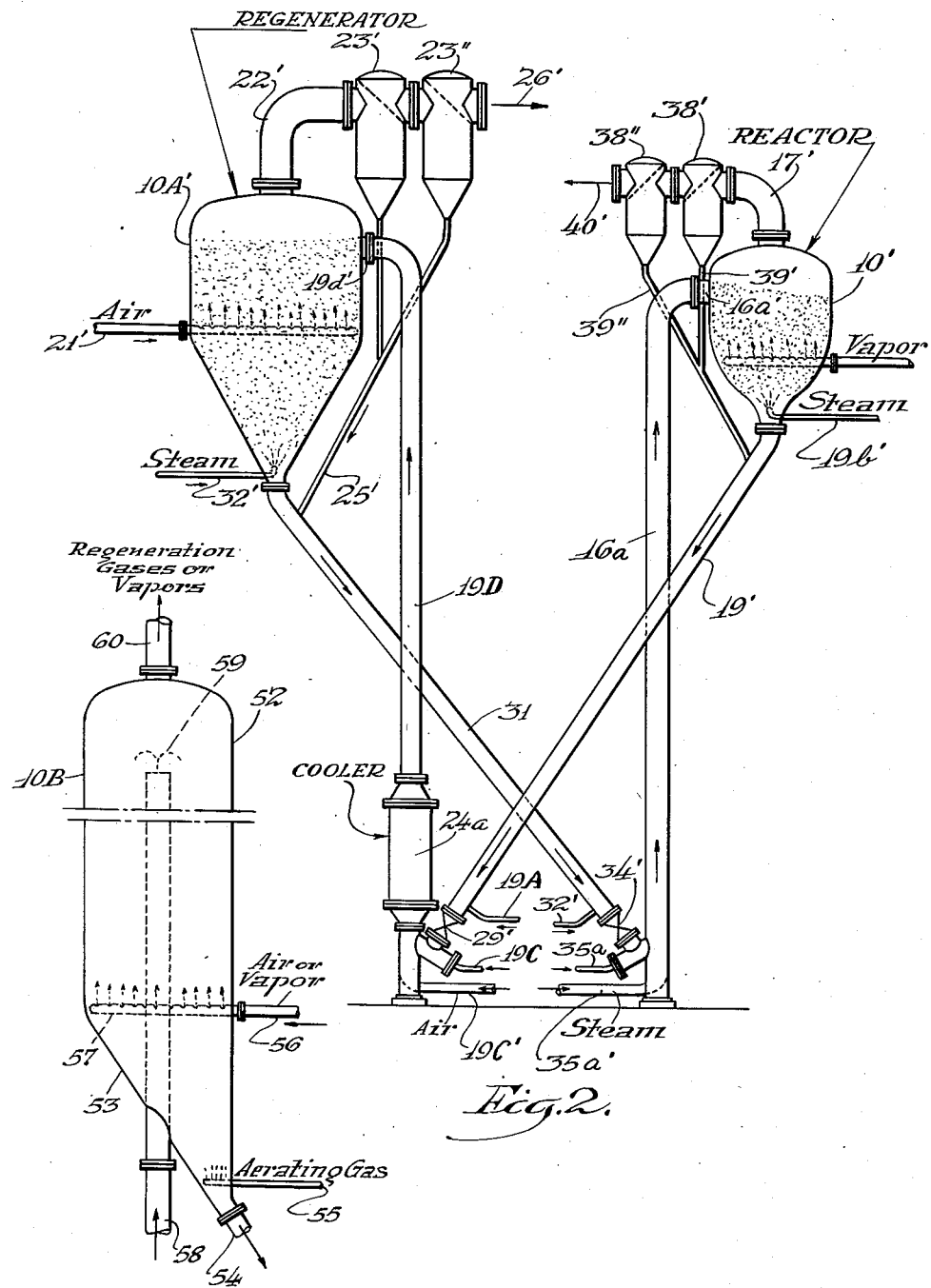

2,488,030

UNITED STATES PATENT OFFICE 2,488,030

FLUIDIZED CATALYTIC CONVERSION PROCESS

Fred W. Scheineman, Chicago, Ill., assignor to Standard Oil Company, Chicago, Ill., a corporation of Indiana Application April 27, 1942, Serial No. 440,566

4 Claims. (Cl. 196—52)

This invention relates to a method and apparatus for converting hydrocarbon oils by contacting the vapors thereof with porous, solid catalysts in a subdivided condition, suspended in vapors. It also relates to a method and apparatus for regenerating spent catalyst and for transferring catalyst from the contacting zone to the regeneration zone and from the regeneration zone to the contacting zone. This application is a continuation-in-part of my copending application Serial No. 392,848 filed May 10, 1941 and application Ser. No. 400,956, filed July 3, 1941. Certain of the features of apparatus and operation herein set forth are separately described and claimed in the following applications: Page Ser. No. 376,763, filed January 31, 1941 and Gunness Ser. No. 400,958, filed July 3, 1941. Related applications include Johnson Ser. Nos. 392,846-7, filed May 10, 1941 The copending application was directed to a unitary system with the reactor mounted above the regenerator or vice versa while the present application is directed to the side by side mounting of the reactor and regenerator which was taught by my copending application but not illustrated in the drawings thereof.

An object of my invention is to eliminate as far as possible the numerous contactors, separators and feeders employed heretofore in converting hydrocarbon oils with suspended catalyst thereby reducing the energy required to transfer catalyst from zone to zone and facilitating the use of high catalyst-to-oil ratios.

A further object is to utilize the pressure at the base of a contacting chamber or at the base of a standpipe depending therefrom, for injecting catalyst material in a gas or vapor stream entering an upper or intermediate point in another contacting chamber. Other objects will be apparent as the detailed description of the invention proceeds.

In practicing my invention I pass a gas or vapor upwardly through a reactor, introduce regenerated catalyst at an intermediate or upper part of the reactor and withdraw catalyst from a low point in said reactor, the return of catalyst and flow of gas or vapor being so regulated as to maintain a catalyst density within the reactor within the approximate range of 10 to 25 pounds per cubic foot, for example about 18 pounds per cubic foot. With a relatively long reactor the pressure differential between the top and bottom may be of the order of 4 to 12 pounds or more per square inch. When catalyst is picked up in a gas stream from the base of this reactor or from a standpipe depending therefrom, the resulting catalyst dispersion may have a bulk density of only a few pounds per cubic foot or even less than one pound per cubic foot. This catalyst may thus be introduced at an intermediate or upper part of the regenerator through a transfer line by a gas lift effect. Similarly, the pressure differential from the top to the bottom of the regenerator may be about 4 to 12 pounds per square inch (since the suspended catalyst in the regenerator is at a bulk density of 10 to 25 pounds per cubic foot) and pressure head at the base of the regenerator serves to introduce catalyst from the base of the regenerator into a gas or vapor stream entering an upper or intermediate part of the reactor. While standpipes may be employed at the base of the reactor and the regenerator these standpipes may be relatively short and, in fact may be entirely dispensed with since the lower part of these vessels themselves act as a standpipe and may provide the necessary pressuring of the catalyst for effecting catalyst transfer.

The invention will be more clearly understood from the accompanying drawings which form a part of this specification and in which:

Figure 1 is a schematic flow diagram illustrating a side by side mounting of the reactor and regenerator together with certain other accessories, Figure 2 is a schematic flow diagram illustrating another arrangement of reactor-regenerator and accessories, and Figure 3 is a schematic vertical section of still another modification of my invention illlustrating a preferred means for introducing catalyst into a reactor or regenerator and for withdrawing catalyst therefrom.

My process may be considered to be essentially a "two chamber process." Contacting and separation takes place simultaneously in the chambers and relatively low pressure differentials prevail, making it easy to transfer catalyst by gravity or in gas suspension.

Referring to Figure 1, tower 10 is a reaction chamber and in tower 10A is a regeneration chamber mounted by the side thereof, the regeneration chamber usually being at least three or four times as large as the reaction chamber. I prefer to employ enlarged upper portions on both of said chambers to facilitate the settling of as much catalyst as possible from ascending gases and vapors and for thus decreasing the load on the centrifugal separators.

In operation, hydrocarbon oil feed stock, for example gas oil, is charged by line 11 to furnace 12 where it is vaporized and the vapors are conducted at elevated temperature, e. g., 700 to 1050° F. through transfer line 13 leading to reaction zone 14 in the intermediate part of chamber or tower 10. The vapors may be admitted to the reaction zone by means of distributor 15.

The catalyst is introduced into the reaction zone by line 16 and one of the branch lines 16', 16" or 16'". The catalyst particles tend to remain in suspension in the "dense" zone which extends from distributor 15 to the enlarged settling section in the upper part of tower 10. Above the "dense" zone there is a light "disperse" zone in which most of the catalyst separates and settles from the ascending vapor stream back to the "dense" zone. The hydrocarbon vapors are charged to the reaction zone at a sufficiently low rate to prevent the bulk of the catalyst from being carried out at the top of the reaction zone by outlet 17 leading to one or more centrifugal separators. This rate may be about 0.5 to 5 feet per second (linear velocity), depending on the size of the catalyst particles, density of catalyst, etc. For catalyst particles of about 1 to 100 microns in particle size this rate is preferably about 1 to 3 feet per second. In general, the catalyst in reaction zone 14 will form a suspension whose density is about 10 to 25 pounds per cubic foot in the lower "dense" zone and about 5 to 0.2 pounds per cubic foot or less in the upper or "disperse" catalyst zone. The catalyst gradually deposits in the quiescent zone at the bottom of the reaction chamber and accumulates about the cone 18 in a free-flowing form. The apex of this cone communicates through ducts 19, 19d and one of the branch lines 19d', 19d" and 19d'" to a low point or preferably to an intermediate or upper point in regeneration zone 20. A part of the catalyst is accordingly continually transferred from the reaction zone to the regeneration zone and is replaced by other catalyst entering the reaction zone through line 16. Free-flow of catalyst through ducts 19, 19d, etc. is assured by the introduction of aeration gas such as steam at 19a and 19b. This aeration gas also serves as a stripping medium to remove hydrocarbon vapors from the catalyst. Duct 19 may be a standpipe of variable length or it may be the base of cone 18 itself. Catalyst may be picked up from the base of duct or standipipe 19 by air introduced through line 19c, this air serving as a gas lift medium for returning catalyst through line 19d to an intermediate or upper part of regeneration zone 20.

In regeneration zone 20, carbon accumulated by the catalyst is burned off by means of a current of oxygen-containing gases, for example air, admitted by line 21. This regeneration is highly exothermic and various means may be employed to control the temperature. It is generally desirable to maintain the temperature within the regeneration zone at about 1000° F. Gases leaving the upper part of the regeneration zone by line 22 are conducted to one or more cyclone separators 23 where most of the "carry over" catalyst is removed and returned to the base of the regeneration zone through cooler 24 and line 25. In cooler 24 sufficient heat is abstracted from the hot catalyst to materially assist in controlling the temperature of the regeneration zone. If the catalyst from separator 23 is insufficient for obtaining this temperature control additional catalyst may be passed directly from the dense zone to the cooler through line 23a.

Spent regeneration gases leave the cyclone by line 26 and may be subjected to electrical precipitation or other separation to recover the remaining catalyst suspended therein which has escaped the cyclone 23. For this purpose an electrical precipitator may be used as shown at 27 and the catalyst recovered by this means may be returned by line 28 to regeneration zone 20. Fresh or regenerated catalyst may of course be mixed with the "fines" recovered in the precipitator to facilitate handling and any suitable pressuring or injecting means (not shown) may be employed for returning the fines to the system. If desired, cooling coils (not shown) may be installed in regenerator 20 to carry away part of the heat of regeneration. Such coils may contain water, diphenyl, mercury or other fluid controller of heat which may be employed without decomposition at the elevated temperatures above mentioned.

Inasmuch as gravity flow is employed for conducting the spent catalyst from the base of the reactor through duct or standpipe 19, it is important that the pressure in the bottom of this duct or standpipe be higher than the pressure in the regenerator at the point at which spent catalyst is introduced thereto. This pressure differential may have to be as high as 4 or 5 pounds per square inch but with carefully designed apparatus pressure differentials as low as about 1 pound per square inch may be employed with safety. The pressure in the bottom of standpipe 19 is the sum of the pressure at the top of the reactor plus the pressure head of catalyst in the reactor plus the pressure head of catalyst in the standpipe. Thus with a reactor about 30 feet high with a top pressure of about 6 pounds, the catalyst head in the reactor may be about 4 pounds so that the pressure at the base of the reactor may be about 10 pounds. With similar pressures prevailing in the regenerator it will thus be seen that when catalyst is introduced from the bottom of the reactor to an upper part of the regenerator no standpipe may be necessary at the base of the reactor since the pressure head in line 19d may, by introducing a sufficient amount of air through line 19c, be only about 1 or 2 pounds per square inch. If it is desired to employ a greater catalyst density in line 19d I may employ a standpipe 19 of suitable length for supplying the necessary pressure differential.

Spent catalyst is introduced from standpipe 19 (or directly from the cone bottom 18 of reactor 10) into the regenerator in amounts controlled by valve 29 which is regulated by manual or automatic control means 30 and I prefer to provide means for automatically closing this valve when the pressure in the base of the standpipe (or reactor) is not sufficiently great to give the required pressure differential for returning the spent catalyst to the regenerator and for preventing air (introduced through line 19c) from entering the reactor. As above stated, this pressure differential may be in the general vicinity of 1 pound per square inch or more.

Regenerated catalyst which settles out below the dense phase turbulent zone 20 in regenerator 10A flows downwardly in standpipe 31 wherein it is aerated by steam or other inert gas introduced through line 32. Additional aeration gas may, of course, be introduced above the regenerator bottom through line 33 by means of suitable distributing means. This steam or aerating gas not only maintains the catalyst in fluent condition but it serves to strip out oxygen-containing gases from the catalyst. Here again standpipe 31 may be relatively long or relatively short and it may be entirely eliminated since the lower part of tower 10A may itself serve as the standpipe. It is only necessary that the pressure at the base of the regenerator or standpipe 31 be sufficiently great to effect the return of regenerated catalyst through line 16 to an intermediate or upper part of the reactor.

Catalyst from the base of standpipe 31 is discharged by valve or star feeder 34, picked up by steam introduced through line 35 and conveyed by line 16 back to reactor 10, preferably through branch line 16' or 16''. The introduction of catalyst into an intermediate or upper point in the reaction zone accomplishes to a certain extent a countercurrent treating effect in the reactor. When the catalyst is introduced at about the same point at which reaction vapors are introduced it is necessary to employ a relatively long standpipe on the regenerator and in this case I may use the reaction vapors themselves for carrying the regenerated catalyst to the reactor by introducing charging stock vapors through line 35a and line 35, injecting the mixture of reaction vapors and catalyst upwardly in the reactor through line 16''' and distributor 15. Similarly, if a sufficiently long standpipe 19 is employed below the reactor, the spent catalyst may be returned at the base of the regenerator through line 19d'''. A feature of the present invention is the return of catalyst to upper points in the reactor or regenerator so that standpipes 19 and 31 may be markedly shortened or entirely eliminated.

Fresh catalyst may be introduced into the system at almost any point but I prefer to introduce it with electrically precipitated fines as hereinabove described. In other words, fresh catalyst from hopper 36 may be introduced by line 37 into the base of precipitator 27 and returned by line 28 to the body of regenerated catalyst in reactor 20.

Vapors withdrawn from above the reaction zone 14 by line 17 are passed through a cyclone separation zone 38 and the catalyst recovered therein is returned by line 39 to the lower part of reaction zone 14. The cyclone separation zone may be a multi-stage system mounted outside of the reactor or inside of the reactor as described in U. S. Letters Patent 2,337,684.

Reaction vapors from cyclone separation zone 38 are then conducted by line 40 to a fractionation system diagrammatically illustrated by fractionating tower 41 from which gas oil side streams may be withdrawn through lines 42 and 43 and from which a bottoms fraction may be withdrawn through line 44 and recycled with feed stock in line 11. The overhead from tower 41 may be passed through cooler 45 to a separator 46 from which water may be withdrawn through line 47. The gases and liquid hydrocarbons from the separator may then be introduced into one or more high pressure fractionation systems diagrammatically illustrated by column 48 from which light gases are taken overhead through line 49, a $C_3$–$C_4$ fraction through line 50 and a gasoline fraction through line 51.

In Figure 2 I have illustrated another side by side arrangement of reactor and regenerator which is the same in principle as the system hereinabove described but in which a different arrangement of separation and cooling means is illustrated. In this case reactor 10' is provided with a bottom extension or standpipe 19' and catalyst is picked up from the base of this extension or standpipe by air introduced through line 19C and line 19C'. Return line 19D is provided with a cooler 24a so that in this case the total spent catalyst is cooled before it enters the regenerator 10A'. Similarly, regenerated catalyst from the base of the regenerator or from an extension thereof or standpipe 31' is picked up with steam introduced through lines 35a and 35a' and returned by lines 16a and 16a' to reactor 10'.

In Figure 2 I have shown an external mounting of cyclones 38' and 38'' and have shown the return of catalysts therefrom through lines 39' and 39'' to standpipe or extension 19'. Similarly cyclones 23' and 23'' are mounted exterior of regenerator 10A' and the recovered catalyst is passed by line 25' to the lower part of regenerator or to standpipe 31'. Generally speaking, however, I prefer to mount the cyclones inside an enlarged upper section in the reactor or regenerator as diagrammatically illustrated in Figure 1.

In Figure 3 I have shown another modification of a contacting vessel 52 which may be used either for a reactor or a regenerator. This vessel has an inclined bottom wall 53 and catalyst is removed from the base of the vessel through extension 54 to be picked up by gas or vapor and conveyed to another contacting vessel. An aerating gas may be introduced near the base of the vessel through line 55. The air for catalyst regeneration or the vapor for catalytic conversion may be introduced through line 56 and distributor 57. The catalyst may be introduced through line 58 against deflecting baffle 59. The upper part of chamber 52 may be enlarged to facilitate the settling and return of catalyst to the dense phase and cyclones may be mounted in this enlarged upper portion of the chamber as hereinabove described in connection with Figure 1. Gases or vapors may leave the top of the chamber through line 60. It will be seen from the above description that I have accomplished the objects of my invention and have provided a system of ultimate simplicity which requires a minimum of work for catalyst transfer. While the invention has been described as applied to a particular process, namely, catalytic cracking, and to operations under particular conditions, it should be understood that it is applicable to conversion processes generally and to a wide range of operating conditions. For catalytic cracking of gas oils I may employ catalysts of the silica-alumina or silica-magnesia type. Such a catalyst may be prepared by the acid treating of natural clays such as bentonite or montmorillonite, or by incorporating a metal oxide, such as alumina, magnesia, thoria, zirconia, etc. with activated silica. One method of preparing a catalyst is by ball-milling silica hydrogel with alumina or magnesia using about 2 to 30% of alumina or magnesia. The ball-milled dough may be dried at about 240° F. and then activated by heating to a temperature of about 900 to 1000° F. No invention is claimed in the composition or preparation of the catalyst per se and it is therefore unnecessary to describe the catalyst in further detail.

In this particular example the catalyst is in powdered form with a particle size of about 10 to 100 microns with about 50% of the catalyst passing a 400 mesh screen. The invention is applicable, however, to other catalyst sizes provided only that the catalyst be of such size and density that it may be aerated and handled as a fluid in the manner herein described. The vertical gas or vapor velocity in my reactor and regenerator for this finely divided catalyst may be about 1 to 5, usually about 1½ to 2½ feet per second in order to maintain the desired dense turbulent suspended catalyst phase above the point of fluid inlet in the reactor and the regenerator respectively. Higher gas or vapor velocities may be required for coarser catalyst particles.

For catalytic cracking of most charging stocks the temperature in the reactor should be about 750 to 950° F. and the weight ratio of catalyst introduced through line 16 to oil introduced through line 13 should be about 1:1 to 10:1 or more and may, for example, be about 4:1. This ratio varies with the character of the catalyst and the oil treated and a feature of my system is the facility with which catalyst-to-oil ratios may be varied for controlling the amount of conversion in the reactor. The vapor contact time in the reactor may be about 10 or 15 seconds and the catalyst residence time in the reactor may be varied throughout a relatively wide range depending upon the catalyst-to-oil ratios employed. Usually catalyst residence time will be about 1 to 10 minutes or more. The space velocity may be about 1 or 2 volumes of liquid oil charged per hour per volume of compacted catalyst in the reaction zone (assuming the catalyst has settled and come to rest) although space velocity may be as low as .25 or as high as 10.

By the use of my simple apparatus having low pressure differentials and substantially the same pressures in the regeneration zone and reaction zone respectively, I can easily operate with high catalyst-to-oil ratios at a very low cost. By using high catalyst-to-oil ratios I not only obtain better conversion by the use of fresher catalyst but I store enough heat in the catalyst in the regeneration zone to supply substantially all of the heat required by the endothermic reaction in the reaction zone. In fact, the charging stock may be only partially vaporized in furnace 12 and the heat stored in the regenerated catalyst may serve to effect the completion of the vaporization as well as the cracking.

By employing a bottom catalyst draw-off in both the reactor and regenerator and thus superimposing the pressure in these zones on the standpipes or outlets at the base thereof, I have provided an extremely compact system which does not require the extremely high standpipes and complicated separation systems heretofore deemed necessary in operations of this character. Great savings are effected not only in capital investment costs but in operating costs and I obtain remarkable flexibility of operation and ease of control.

It should be pointed out that the pressures at the top of the reactor and regenerator may be controlled and held within close limits by pressure controlled valves 61 and 62 in lines 40 and 26 respectively. The control and maintenance of pressures in the top of the contacting chambers is of course a matter of considerable importance in a system in which the whole operation is dependent upon relatively small pressure differentials.

My invention is not limited to the catalytic cracking of gas oils but it may also be employed for other processes such as the conversion of low knock rating naphthas into high knock rating gasolines. For this purpose the entire system may be operated under higher pressures, i. e., pressures of about 50 to 450 pounds per square inch. The catalyst may be chromium oxide, molybdenum oxide, tungsten oxide, vanadium oxide or the like mounted on active alumina. In this system the reaction may be conducted in the presence of hydrogen or recycle gas supplied to the reaction along with charging stock vapors.

While I have described a specific example of my invention, specific operating conditions, etc. it should be understood that the invention is not limited to such details since other modifications and variations in the system and in the operating conditions will be apparent to those skilled in the art from the above description.

I claim:

1. The method of effecting catalytic conversion and catalyst regeneration in a process employing catalyst solids of small particle size, which method comprises effecting combustion of carbonaceous material in a regeneration zone to maintain said zone at regeneration temperature, maintaining a dense turbulent phase of suspended catalyst solids in said regeneration zone by passing an oxygen-containing regeneration gas upwardly therein at low velocity, withdrawing regenerating gas from the top of the regeneration zone, withdrawing catalyst solids from said dense phase as a hot downwardly moving aerated column, suspending hot catalyst from the base of said column in a stream of hydrocarbons and introducing it while hot into the bottom of a conversion zone whereby the catalyst may supply heat to said conversion zone, passing hydrocarbons upwardly in the conversion zone as a gasiform stream at such a rate as to maintain the catalyst in dense phase turbulent suspension therein whereby hydrocarbon conversion is effected and the catalyst solids become deactivated by the deposition of carbonaceous material thereon, withdrawing conversion products from the upper part of the conversion zone, withdrawing deactivated catalyst from the conversion zone as a downwardly moving aerated column, cooling said downwardly withdrawn catalyst and introducing said cooled catalyst into the upper part of the regeneration zone whereby the gas in the upper part of the regeneration zone is contacted with the cooled introduced catalyst before said gas is withdrawn from the regeneration zone.

2. The method of contacting a mass of solids of small particle size with a plurality of gasiform streams which method comprises maintaining a first body of said solids in dense phase suspension in a first contacting zone by passing a first gasiform stream upwardly through said zone at low velocity, positively regulating the removal of the first gasiform stream from the upper part of the first contacting zone in accordance with the pressure at the upper part of said zone in order to maintain said pressure substantially constant during periods of fluctuating flow, downwardly withdrawing aerated solids as a column from said first contacting zone whereby the pressure at the base of the column is augmented by a pressure head of suspended solids in the contacting zone and the pressure at the top of said zone, dispersing said downwardly withdrawn solids in a second gasiform stream and introducing said second stream with dispersed solids into a second contacting zone, introducing a third gasiform stream at the base of said second contacting zone at such a rate that the vertical gas velocity in the second contacting zone is sufficient to maintain a dense phase of suspended solids therein, positively controlling the rate of removal of gases from the upper part of the second contacting zone in accordance with the pressure at the top of said zone for maintaining said pressure substantially constant during periods of fluctuating flow, downwardly withdrawing aerated solids as a column from said second contacting zone so that the pressure at the base of the column is augmented by a pressure head of suspended solids in the second contacting zone and the pressure at the top of said second contacting zone and returning said last named downwardly withdrawn solids to said first contacting zone.

3. The method of claim 2 which includes the additional step of stripping solids removed from said first contacting zone before said solids are dispersed in said second gasiform stream for introduction into said second contacting zone.

4. The method of contacting a mass of solids of small particle size with a first gasiform stream in an exothermic contacting zone and a second gasiform stream in an endothermic contacting zone, which method comprises maintaining a dense turbulent phase of suspended solids in said exothermic contacting zone by passing a first gasiform stream upwardly therein at low velocity under conditions for effecting exothermic reaction, disengaging solids from gas in the upper part of said zone and withdrawing the gas from said upper part of said zone, withdrawing solids from said dense phase as a hot downwardly moving aerated column, suspending hot solids from the base of said column in a second gasiform stream and introducing said second stream with suspended hot solids into the bottom of an endothermic contacting zone whereby the solids may supply heat to said conversion zone, passing the second gasiform stream upwardly in the endothermic contacting zone and at such a rate as to maintain the solids in dense phase turbulent suspension therein under conditions for effecting endothermic conversion, disengaging gases from solids in the upper part of the endothermic contacting zone and withdrawing gasiform materials from said upper part thereof, withdrawing solids from the endothermic contacting zone as a downwardly moving aerated column, cooling said downwardly withdrawn solids and introducing said cooled solids into the upper part of the exothermic contacting zone whereby the gas in the upper part of the exothermic contacting zone is contacted with the cooled introduced solids before said gas is withdrawn from the exothermic contacting zone.

FRED W. SCHEINEMAN.

REFERENCES CITED

The following references are of record in the file of this patent:

UNITED STATES PATENTS

| Number | Name | Date |
|---|---|---|
| 1,984,380 | Odell | Dec. 18, 1934 |
| 2,231,231 | Subkow | Feb. 11, 1941 |
| 2,253,486 | Belchetz | Aug. 19, 1941 |
| 2,264,438 | Gaylor | Dec. 2, 1941 |
| 2,270,903 | Rudbach | Jan. 27, 1942 |
| 2,289,329 | Prickett | July 7, 1942 |
| 2,302,209 | Goddin, Jr. | Nov. 17, 1942 |
| 2,303,047 | Hemminger | Nov. 24, 1942 |
| 2,304,128 | Thomas | Dec. 8, 1942 |
| 2,305,569 | Degnen | Dec. 15, 1942 |
| 2,326,705 | Thiele et al. | Aug. 10, 1943 |
| 2,327,175 | Conn | Aug. 17, 1943 |
| 2,340,878 | Holt et al. | Feb. 8, 1944 |
| 2,385,446 | Jewell et al. | Sept. 25, 1945 |